United States Patent
Wahl

(10) Patent No.: US 7,890,616 B2
(45) Date of Patent: Feb. 15, 2011

(54) SYSTEM AND METHOD FOR VALIDATION OF MIDDLEWARE FAILOVER BEHAVIOR

(75) Inventor: Mark Frederick Wahl, Austin, TX (US)

(73) Assignee: Informed Control Inc., Austin, TX (US)

( * ) Notice: Subject to any disclaimer, the term of this patent is extended or adjusted under 35 U.S.C. 154(b) by 389 days.

(21) Appl. No.: 12/072,183

(22) Filed: Feb. 25, 2008

(65) Prior Publication Data

US 2008/0215743 A1 Sep. 4, 2008

Related U.S. Application Data

(60) Provisional application No. 60/904,528, filed on Mar. 2, 2007.

(51) Int. Cl.
*G06F 15/173* (2006.01)

(52) U.S. Cl. ........................ 709/223; 709/221; 709/230; 714/4; 714/6; 714/25; 714/41; 714/43; 703/22

(58) Field of Classification Search ................ 709/223, 709/230; 714/4, 6, 3, 25, 41, 43; 703/22
See application file for complete search history.

(56) References Cited

U.S. PATENT DOCUMENTS

| | | | |
|---|---|---|---|
| 6,728,897 B1 | 4/2004 | Cramer et al. | |
| 6,944,788 B2* | 9/2005 | Dinker et al. | 714/4 |
| 7,246,256 B2 | 7/2007 | De La Cruz et al. | |
| 7,328,144 B1 | 2/2008 | Grier et al. | |
| 2005/0268145 A1* | 12/2005 | Hufferd et al. | 714/2 |
| 2006/0028994 A1* | 2/2006 | Hofmann et al. | 370/252 |
| 2006/0168112 A1* | 7/2006 | Weng et al. | 709/218 |
| 2006/0294232 A1* | 12/2006 | Gonsalves et al. | 709/224 |
| 2007/0011330 A1* | 1/2007 | Dinker et al. | 709/226 |
| 2007/0155394 A1* | 7/2007 | Hawkins | 455/452.2 |
| 2007/0168925 A1* | 7/2007 | Bornhoevd et al. | 717/104 |
| 2007/0198631 A1* | 8/2007 | Uhlmann | 709/203 |
| 2008/0100443 A1* | 5/2008 | Grunwald et al. | 340/572.1 |
| 2008/0126110 A1* | 5/2008 | Haeberle et al. | 705/1 |
| 2008/0228917 A1* | 9/2008 | Auvenshine et al. | 709/224 |

* cited by examiner

*Primary Examiner*—Thuong T Nguyen

(57) ABSTRACT

An information processing system containing middleware and backend server software components is augmented with the ability to validate the behavior of the middleware system when one or more backend servers are unavailable, based on dynamic reconfiguration of the network layer protocol software component in the operating system underlying the middleware software component.

3 Claims, 17 Drawing Sheets

PENDING LIST TABLE

| TEST ID | START DATE | STATE | AGENT LIST | END DATE |
|---|---|---|---|---|
|  |  |  |  |  |
|  |  |  |  |  |

360

AGENT TABLE

| AGENT ID | SYSTEM | CREDENTIALS | NETWORK SETTINGS | STATE |
|---|---|---|---|---|
|  |  |  |  |  |
|  |  |  |  |  |

362

MIDDLEWARE TABLE

| AGENT ID | PORT | SOFTWARE | CREDENTIALS | PROTOCOL SETTINGS |
|---|---|---|---|---|
|  |  |  |  |  |
|  |  |  |  |  |

FAILOVER TABLE

364 {

| AGENT ID | SYSTEM | DATE | ALT SYSTEM | STATE |
|---|---|---|---|---|
|  |  |  |  |  |
|  |  |  |  |  |

COMPLETION TABLE

366 {

| TEST ID | DATE | STATE | AGENT LIST | REPORT |
|---|---|---|---|---|
|  |  |  |  |  |
|  |  |  |  |  |

FIG. 13

SYSTEM AND METHOD FOR VALIDATION OF MIDDLEWARE FAILOVER BEHAVIOR

CROSS-REFERENCE TO RELATED APPLICATIONS

This application claims the benefit of PPA Ser. No. 60/904,528 filed Mar. 2, 2007 by the present inventor, which is incorporated by reference.

FEDERALLY SPONSORED RESEARCH

Not applicable

SEQUENCE LISTING OR PROGRAM

Not applicable

BACKGROUND OF THE INVENTION

1. Field of Invention

This invention relates generally to the management of distributed systems in computer networks.

2. Prior Art

In many enterprise computer networks, a 'multi-tier' application deployment model is used. A client application, running on a user's desktop computer system attached to the enterprise network, accesses a network-based service provided by an application server located on a server computer on that network. That application server may in turn act as a middleware client to access other network-based services, provided by backend servers or databases located on other server computer systems on that network. FIG. 2 is a diagram that illustrates the network protocol connections between a client (35) and an application server that integrates a middleware component (34), and between that middleware component and a backend server (37) and optionally an alternate backend computer system (38).

Many servers and databases support high availability for the services they provide, by enabling the service to be implemented by multiple, coordinated servers located on distinct server computer systems. Should one computer system providing the service become unavailable, the other server or servers for that service will continue to provide the service to the middleware clients.

In some cases, the high availability capability provided by a particular vendor's servers is integrated with the network infrastructure, so that a middleware client is not aware when a particular server becomes unavailable. However, it is more common for the server software to be independent of the network infrastructure. Thus, the middleware client for a particular service must be configured with a set of network addresses of the servers that provide that service. If the middleware client detects that a server providing a particular service is unavailable, then the middleware client will retry the operation at another server for that service. This requires that the configuration information of the network addresses of the set of servers providing a particular service be provided to all potential middleware clients of that service. As in many cases this is manually configured by a system administrator when an application server that contains a middleware client is installed, there is a risk that changes to the server or network topology might result in the application server that contains a middleware client no longer holding the correct configuration information. This configuration issue has historically been difficult to detect as the application server might appear to be working properly, and only fail when some of the servers that it has been relying upon become unavailable.

Testing of the failover behavior of a middleware software component under conditions of network or backend server failure is useful to validate the correct operation of that component, and to predict whether the component will function properly should a particular backend server which that component relies upon become unavailable. However, shutting down a backend server in order to test middleware software can be difficult or inappropriate for many enterprises, as:
- the backend server might be operated by a different department in the enterprise, or might be operated by another enterprise to which this enterprise has outsourced some network services,
- improperly shutting down a backend server might risk corruption of that server's state,
- shutdown of a backend server might result in alarms being generated, or
- the shutdown and recovery of a backend server might require several hours as the backend server restores its state prior to the failure.

SUMMARY

In order to validate the correct operation of a middleware software component under conditions of network or backend server failure, this invention simulates the failure by reconfiguring the network layer of the computer system on which that middleware software component is installed.

DRAWINGS

Figures

FIG. 12, FIG. 13 and FIG. 14 are diagrams illustrating the structure of tables in a database.

REFERENCE NUMERALS

Figure 1:
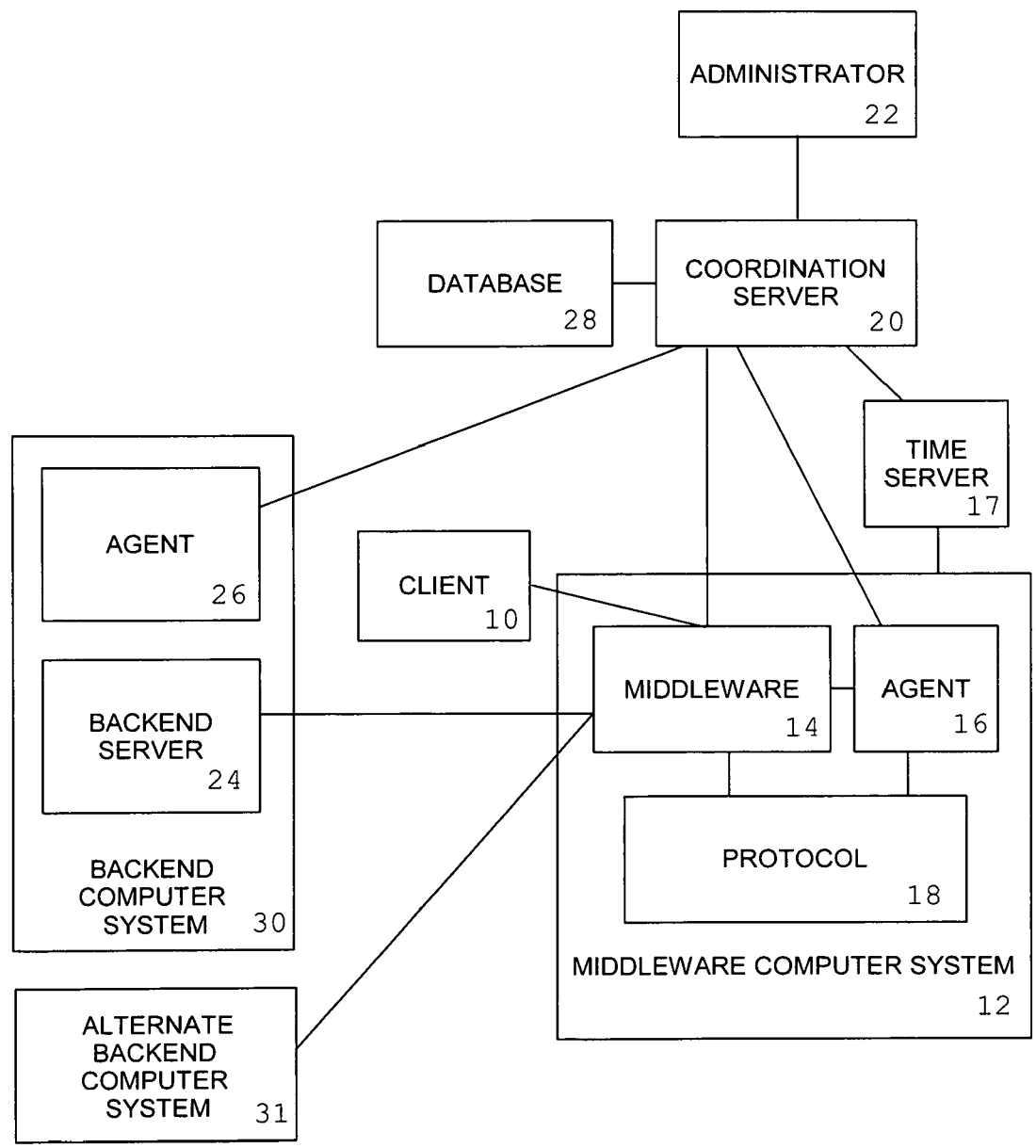
FIG. 1 is a diagram that illustrates the components of the system for middleware failover behavior.
Figure 2:
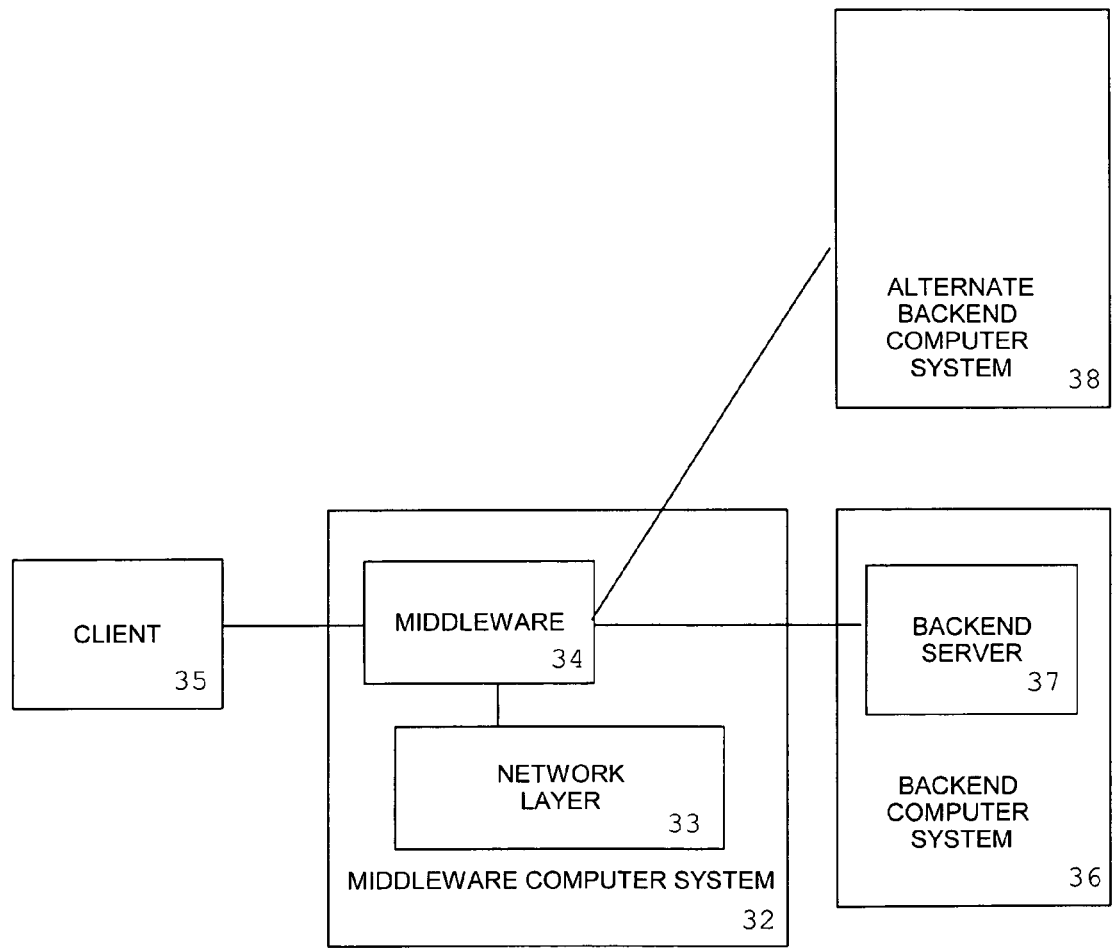
FIG. 2 is a diagram that illustrates prior art components of a computer network.

10 Client
12 Middleware computer system
14 Middleware
16 Middleware agent

17 Time server
18 Protocol
20 Coordination server
22 Administrator
24 Backend server
26 Backend system agent
28 Database
30 Backend computer system
31 Alternate backend computer system
32 Middleware computer system
33 Network layer
34 Middleware
35 Client
36 Backend computer system
37 Backend server
38 Alternate backend computer system
260 Intranet switch
262 Middleware computer
263 Time server computer
264 Middleware computer
266 Application server computer
268 Backend computer
270 Backend computer
272 Coordination server computer
274 Administrator workstation
280 Computer system
282 CPU
284 System bus
286 BIOS ROM
288 RAM
290 Hard disk interface
292 Hard disk
294 Network interface
296 LAN switch
298 Operating system software on hard disk
300 Agent software on hard disk
302 Application software on hard disk
304 Operating system in memory
306 Agent in memory
308 Application in memory
320 Computer system
322 CPU
324 System bus
326 BIOS ROM
328 RAM
330 Hard disk interface
332 Hard disk
334 Network interface
336 LAN switch
338 Operating system software on disk
340 Application software on disk
342 Operating system in memory
344 Application in memory
360 Pending list table
362 Agent table
363 Middleware table
364 Failover table
366 Completion table
368 Agent info table

DESCRIPTION

The goal of this invention is to validate that failover capability of a middleware component is working properly. To achieve this goal, an agent installed on the same computer system as the middleware component being tested is instructed to manipulate the network layer of the operating system. In the case of a TCP/IP network layer, the changes are to reconfigure of IP implementation settings to:
  block incoming connections to the middleware component except from the coordination server,
  block outgoing connections to a specified backend server, and
  monitor outgoing connections to determine what backend servers are contacted by the middleware component.

This invention consists of the following software components, as illustrated in the diagram of FIG. 1:
  a coordination server (20) that manages the tests of middleware behavior,
  a database (28) used by the coordination server to store the configuration parameters and test results,
  a time server (17) that ensures there is time synchronization between the computer systems and servers,
  a middleware agent (16) that interacts with the network layer protocol implementation (18) of the computer system (12) where both it and a middleware component (14) are installed, and
  a backend system agent (26) that monitors the network layer implementation of the computer system (30) where both it and a backend server (24) are installed.

The coordination server (20) can be implemented in software as a web-enabled application running in an application server or web server. The coordination server incorporates two threads of processing: a coordination server scheduling thread, illustrated by the flowchart of FIG. 6A, FIG. 6B and FIG. 6C, and a server administration interaction thread, illustrated by the flowchart of FIG. 7A and FIG. 7B. The coordination server scheduling thread obtains the list of scheduled pending tests from the database, communicates with the middleware components to cause them to attempt interactions with the backend servers, communicates with the agents to cause them to perform the network layer reconfiguration and network statistics gathering to observe the middleware behavior, and sends a report to the administrator. The server administration interaction thread waits for requests from the administrator (22) to create or abandon scheduled pending tests.

The database (28) can be implemented as a relational database. It contains the following tables: a pending list table (360), an agent table (362), a middleware table (363), a failover table (364), a completion table (366) and an agent info table (368).

The pending list table (360) in the database has one row for each pending test that has not yet been completed. The primary key of this table is the TEST ID column. The columns of this table are:
  TEST ID: a unique identifier for the test,
  START DATE: the scheduled date and time for the test to begin,
  STATE: whether the test is pending, in progress, or abandoned,
  AGENT LIST: a list of agents participating in the test, and
  END DATE: the date and time for the test to complete.

The agent table (362) in this database has one row for each backend agent and one row for each middleware agent. The primary key for this table is the AGENT ID column. The columns of this table are:
  AGENT ID: a unique identifier for the agent,
  SYSTEM: the network address of the computer system on which the agent is installed,
  CREDENTIALS: the credentials to access the agent,
  NETWORK SETTINGS: the changes to the operating system network layer for the agent to make on the computer system, and STATE: whether the agent is active, or no longer present.

The middleware table (363) in this database has one row for each middleware agent. The primary key for this table is the AGENT ID column. The columns of this table are:

AGENT ID: the unique identifier for the agent,

PORT: the TCP port number for connections to be made to the middleware software, SOFTWARE: an identifier for the middleware software version and configuration, CREDENTIALS: credentials for the coordination server to authenticate to the middleware software, and PROTOCOL SETTINGS: settings for the protocol for the coordination server to communicate with the middleware software.

The failover table (364) in this database has one row for each middleware component failover detected by a middleware agent. The columns of this table are:

AGENT ID: the unique identifier of the agent,

SYSTEM: the network address of the computer system on which the agent is installed, DATE: the date and time that the failover was detected, ALT SYSTEM: the system to which the failover occurred, and STATE: the state of this row.

The completion table (366) in this database has one row for each test that has been completed. The primary key of this table is the TEST ID column. The columns of this table are:

TEST ID: a unique identifier for the test,

DATE: the date and time the test completed,

STATE: the result of the test,

AGENT LIST: a list of the identifiers of the agents that participated in the test, and REPORT: a copy of the report provided to the administrator as a result of this test.

The agent info table (368) in this database has one row for each agent that participated in a particular test. The TEST ID and AGENT ID columns together form the primary key of this table. The columns of this table are:

TEST ID: the unique identifier of the test,

AGENT ID: the unique identifier of the agent,

STATISTICS: statistics returned by the agent, and

FAILOVER: failover information returned by the agent.

The middleware agent (16) can be implemented in software running on a computer system that is started automatically when the computer system boots. On Microsoft Windows platforms, the software can be implemented as a Windows service, and on UNIX platforms, the software can be implemented as a daemon process. When the agent starts processing, it creates two threads of execution: an agent protocol thread, illustrated by the flowchart of FIG. 3, and an agent scheduling thread, illustrated by the flowchart of FIG. 4. Additional middleware agent monitoring task threads, as illustrated by the flowchart of FIG. 5, will be created as needed while tests are being performed. The agent has a list of pending tests stored on disk that is read when the agent starts.

The backend system agent (26) can be implemented in software running on a computer system that is started automatically when the computer system boots. On Microsoft Windows platforms, the software can be implemented as a Windows service, and on UNIX platforms, the software can be implemented as a daemon process. When the agent starts processing, it creates two threads of execution: an agent protocol thread, illustrated by the flowchart of FIG. 3, and an agent scheduling thread, illustrated by the flowchart of FIG. 4. Additional backend agent monitoring task threads, illustrated by the flowchart of FIG. 8, will be created as needed while tests are being performed. The agent has a list of pending tests stored on disk that is read when the agent starts.

Figure 9:
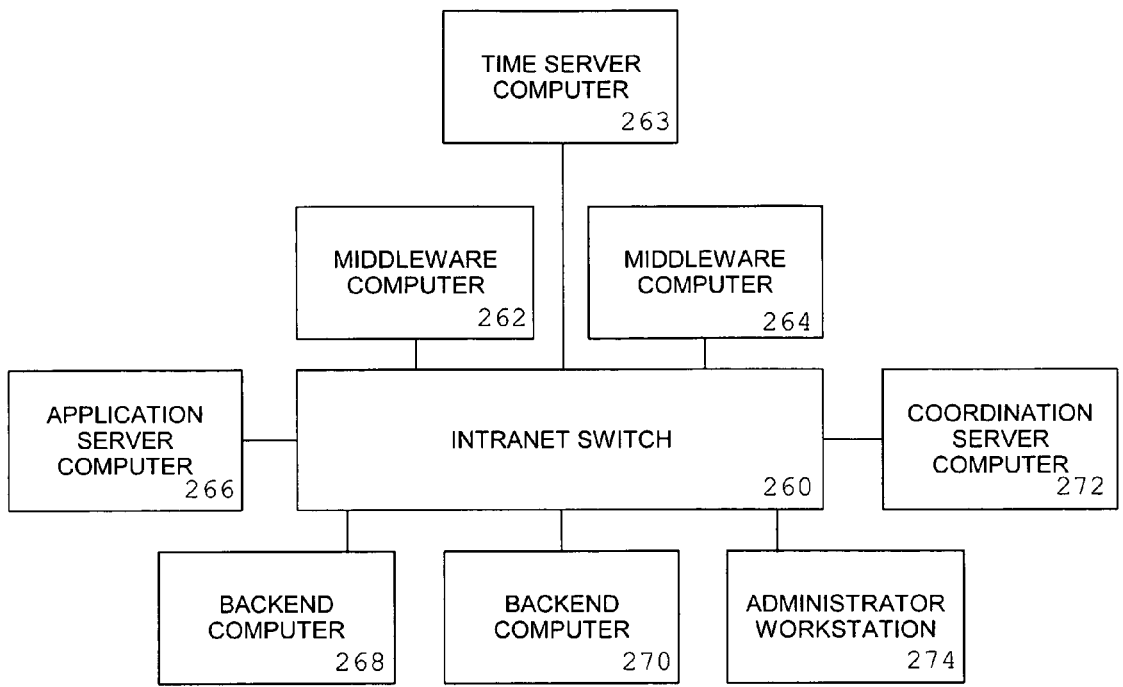
FIG. 9 is a diagram illustrating typical components of an enterprise computer network.

The processing elements of this invention can be implemented as software running on computer systems attached to a local area network, as illustrated in FIG. 9. The coordination server (20) and database (28) can be realized as software running on a coordination server computer (272). The client (10) can be realized as software running on an application server computer (266). The administrator (22) can access the coordination server using an application, such as a web browser, installed on an administrator workstation computer (274). The middleware (14) and middleware agent (16) can be realized as software running on a middleware computer (262 or 264). The backend server (24) and backend agent (26) can be realized as software running on a backend computer (268). The alternate backend computer system (31) can be realized as software running on another backend computer (270). The time server (17) can be realized as software running on a time server computer (263).

Figure 10:
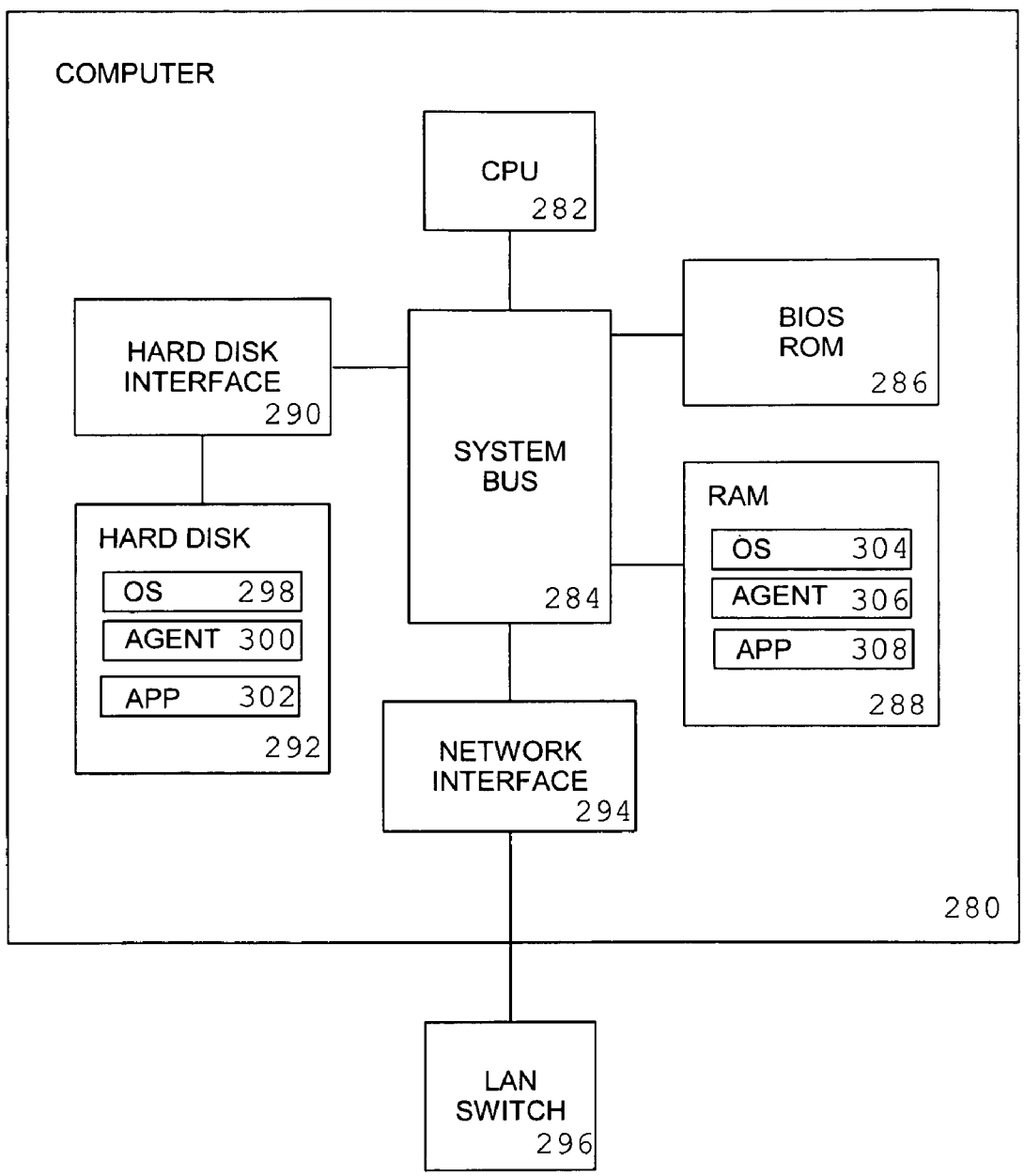
FIG. 10 is a diagram illustrating the typical components of a server computer system that hosts application software and agent software.

FIG. 10 illustrates the typical components of a server computer system that hosts application software and agent software. Examples of computer systems which host application software and agent software include the middleware computers (262 and 264) and the backend computers (268 and 270). The computer system (280) incorporates a system bus (284), a central processing unit (282), a BIOS ROM (286), a hard disk interface (290) and random access memory (288). A network interface (294) connects the computer system to a local area network switch (296). A hard disk drive (292) attached to the hard disk interface stores the operating system software (298), the agent software (300) and the application software (302). The RAM (288) contains the runtime state of the operating system (304), the agent (306) and application (308).

Figure 11:
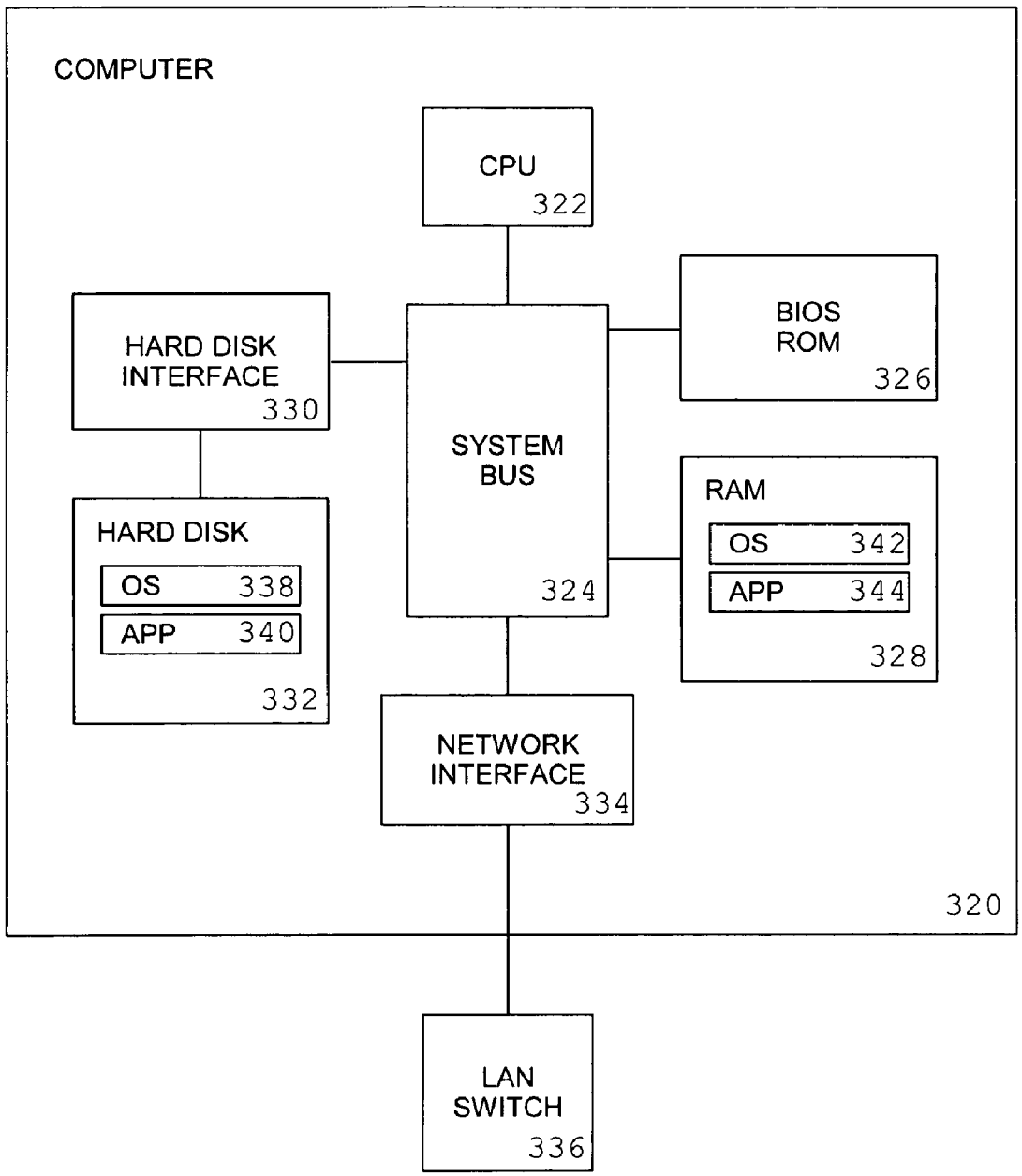
FIG. 11 is a diagram illustrating the typical components of a server computer system that hosts application software.
Figure 14:
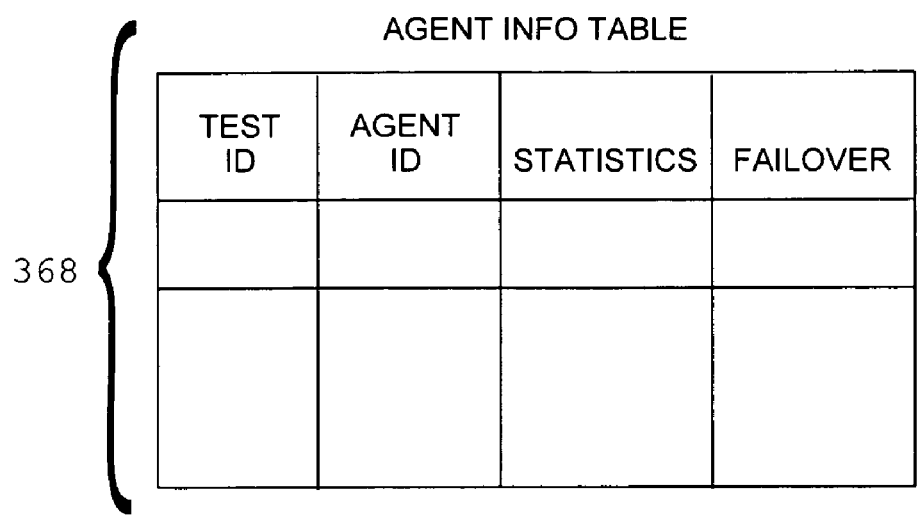

FIG. 11 illustrates the typical components of a server computer system that hosts application software. Examples of computer systems that host application software include the application server computer (266). The computer system (320) incorporates a system bus (324), a central processing unit (322), a BIOS ROM (326), a hard disk interface (330) and random access memory (328). A network interface (334) connects the computer system to a local area network switch (336). A hard disk drive (332) attached to the hard disk interface stores the software of the operating system (338) and application (340). The RAM (328) contains the state of the operating system (342) and application (344).

Operations

Figure 3:
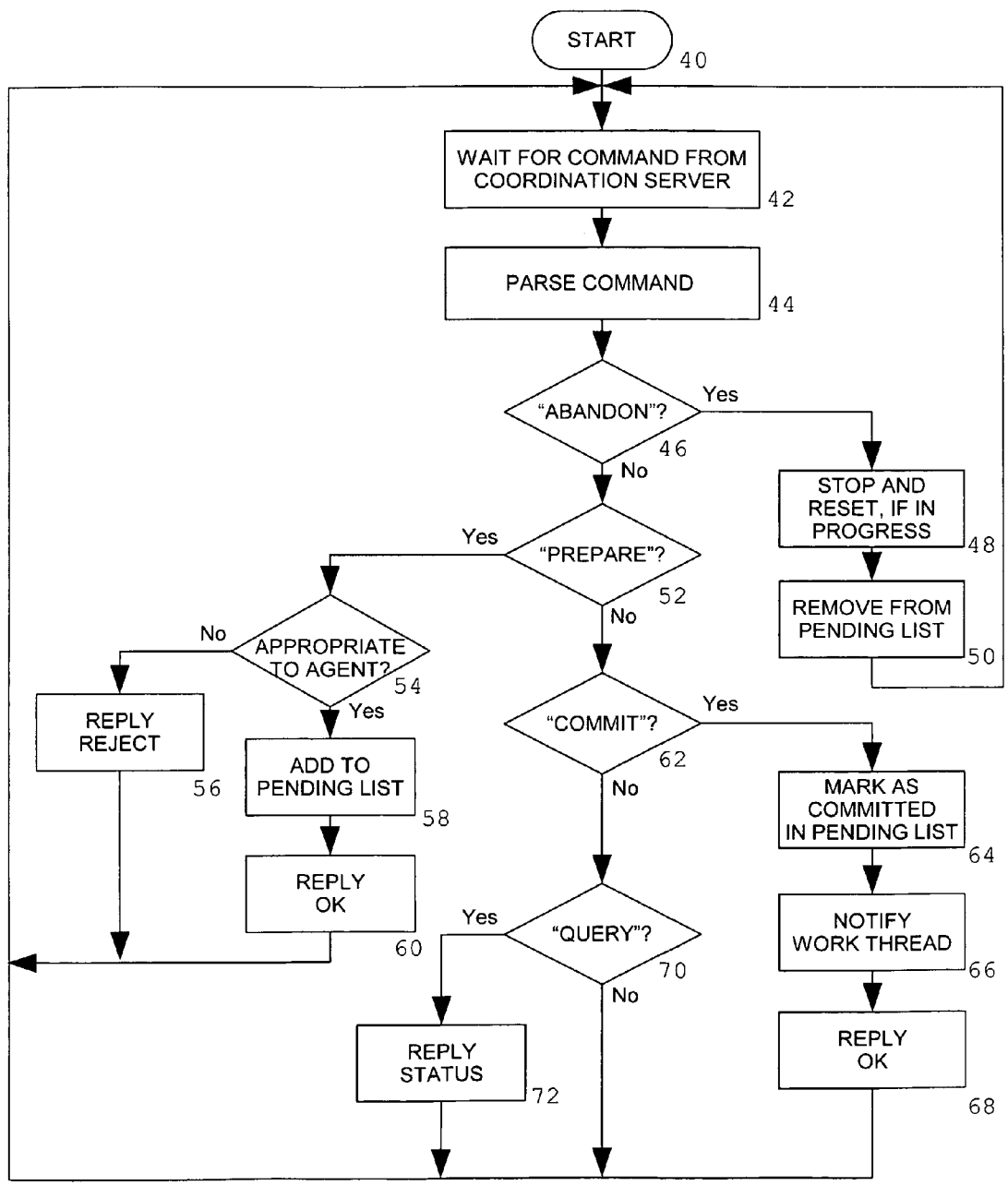
FIG. 3 is a flowchart that illustrates the behavior of an agent protocol thread.

FIG. 3 contains a flowchart that illustrates the behavior of an agent protocol thread. At step 42, the thread will wait for a command from the coordination server. At step 44, the thread will parse the command.

At step 46, the thread will determine if the command is "abandon". If it is, then at step 48, the thread will determine if the specified test to abandon is in progress. If the test is in progress, the thread will stop the test and reset the network settings (if changed). At step 50, the thread will remove the test from the pending list, if present.

At step 52, the thread will determine if the command is "prepare". At step 54, the thread will determine if the specified test included with the command is appropriate to this agent. If the test is not appropriate, then at step 56 the thread will reply to the coordination server with a "reject" response. Otherwise, at step 58 the thread will add the test to the on-disk and in-memory pending list, and at step 60 the thread will reply to the coordination server with an "ok" response.

At step 62, the thread will determine if the command is "commit". At step 64, the thread will mark the specified test as committed on both the on-disk and in-memory pending list, at step 66 will notify the agent scheduler thread, and at step 68 will reply to the coordination server with an "ok" response.

At step 70, the thread will determine if the command is "query". At step 72, the thread will reply to the coordination server with status of the network statistics from a specified completed test.

Figure 4:
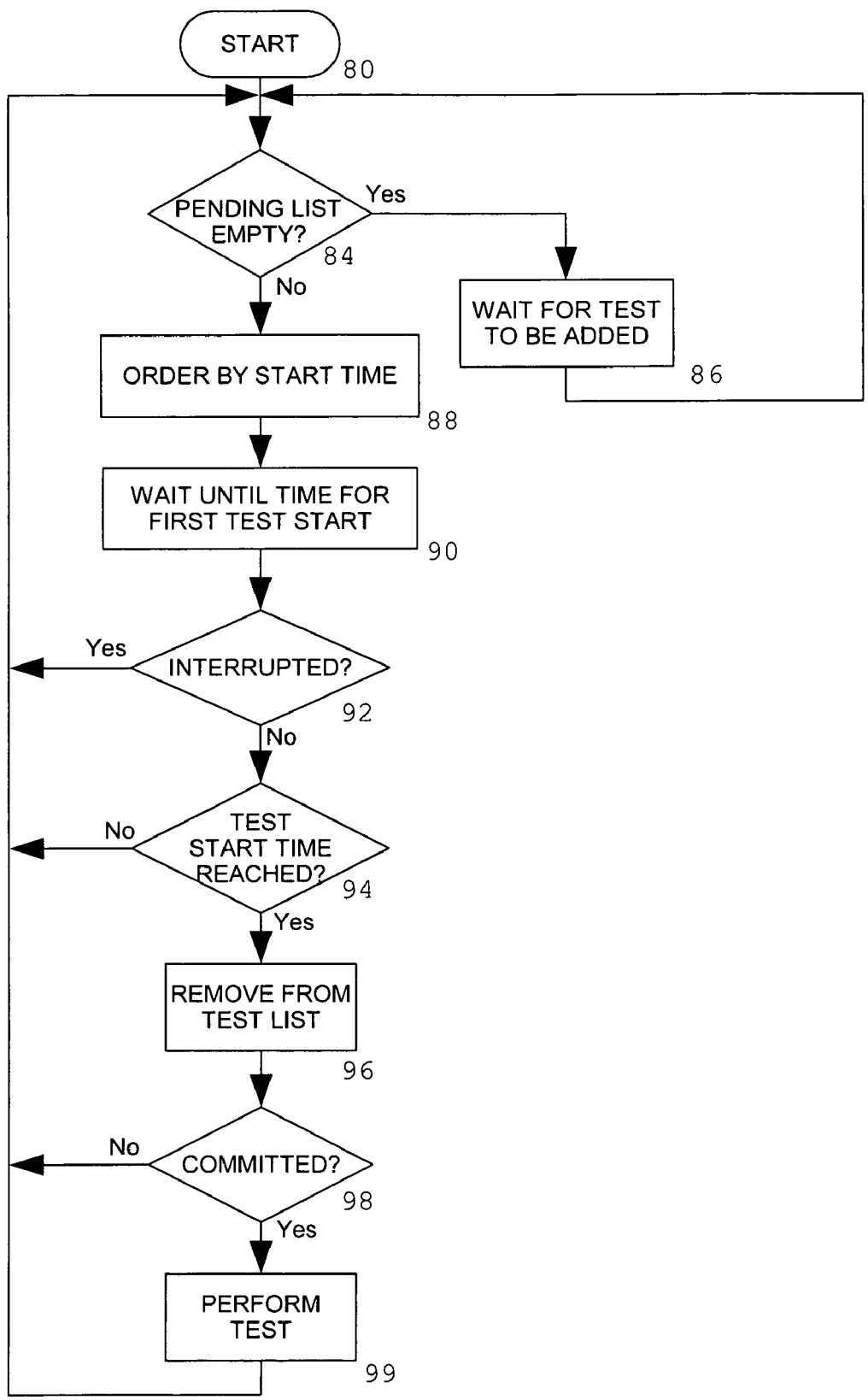
FIG. 4 is a flowchart that illustrates the behavior of an agent scheduling thread.
Figure 5:
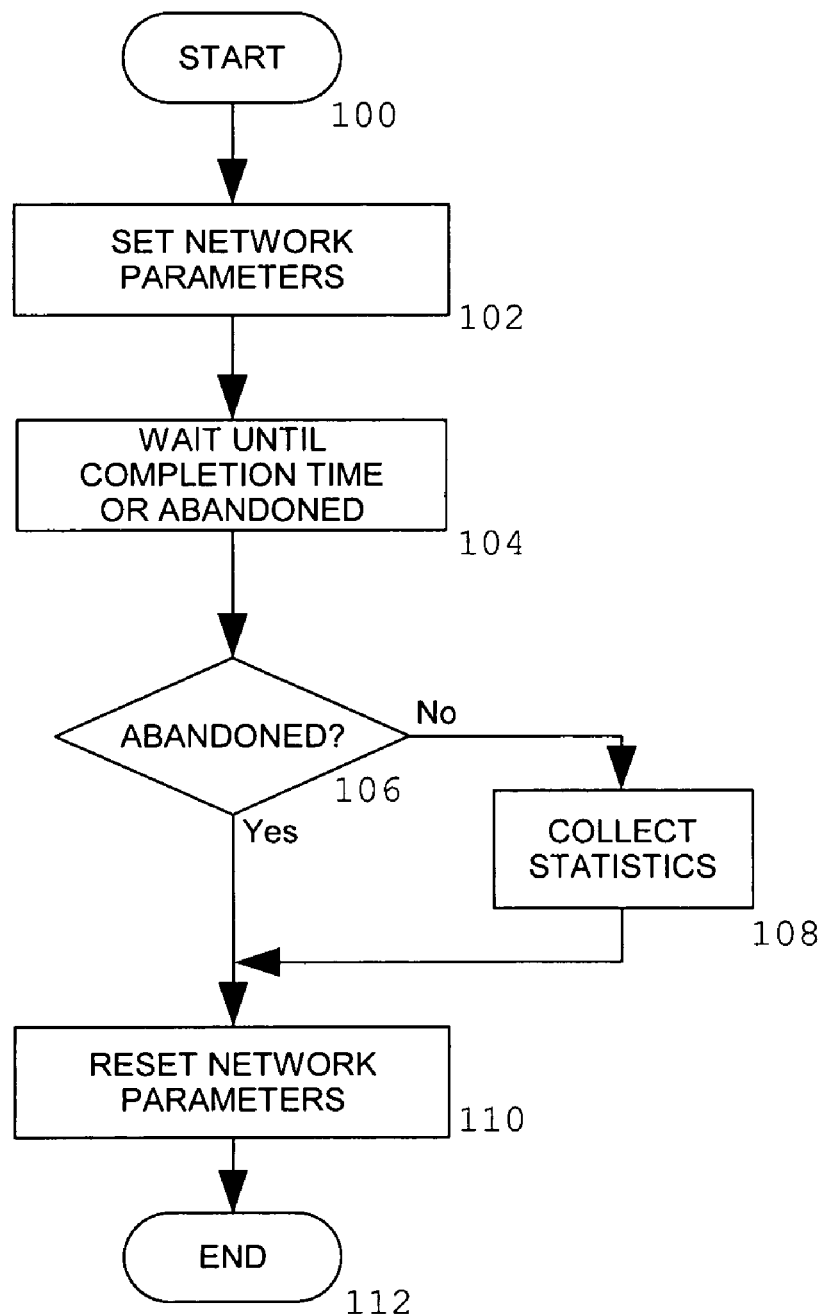
FIG. 5 is a flowchart that illustrates the behavior of a middleware agent monitoring task.
Figure 8:
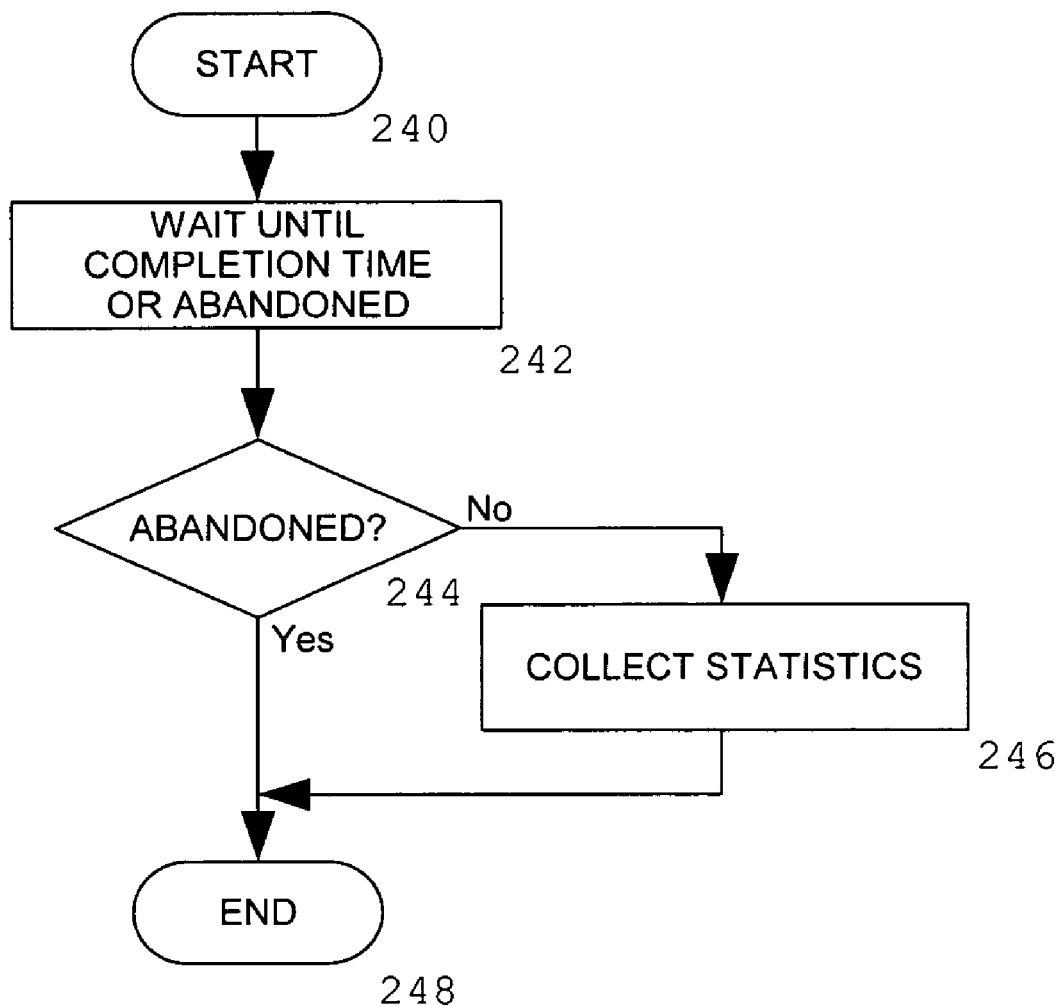
FIG. 8 is a flowchart that illustrates the behavior of a backend agent monitoring task.

FIG. 4 contains a flowchart that illustrates the behavior of an agent scheduling thread. At step 84, the agent scheduling thread will check if the pending list is empty. If the list is empty, then at step 86 the thread will wait for a test to be added. At step 88, the thread will order the pending tests by start time, and at step 90 the thread will wait until the time for the first test to start. If the waiting is interrupted, then at step 92 the thread will re-scan the list, in case an earlier test was added. At step 94, the thread will check if the start time was reached, and if the start time was not reached, then the thread will re-scan the list. Once the task start time is reached, at step 96 the thread will remove the test from the pending test list. At step 98, the thread will check whether the specified test has been committed, and if it has not, the test will be ignored. At step 99, the thread will start a new thread to perform the test. If the agent is a middleware agent, then the newly created thread will be a middleware agent monitoring task thread, as illustrated in FIG. 5. If the agent is a backend agent, then the newly created thread will be a backend agent monitoring task thread, as illustrated in FIG. 8.

FIG. 5 contains a flowchart that illustrates the behavior of a middleware agent monitoring task thread. At step 102, the thread will save the parameters of the network layer of the operating system, and then set the network parameters in the network layer of the operating system, as specified for the test. At step 104, the thread will wait until the test completion time, or until the test is abandoned. At step 106, the thread will test whether the test is abandoned. If the test is not abandoned, then at step 108 the thread will collect statistics from the operating system network layer, and save these in memory for later retrieval by the coordination server using the "query" command. At step 110, the thread will reset the network parameters to their previous value.

Figure 6A:
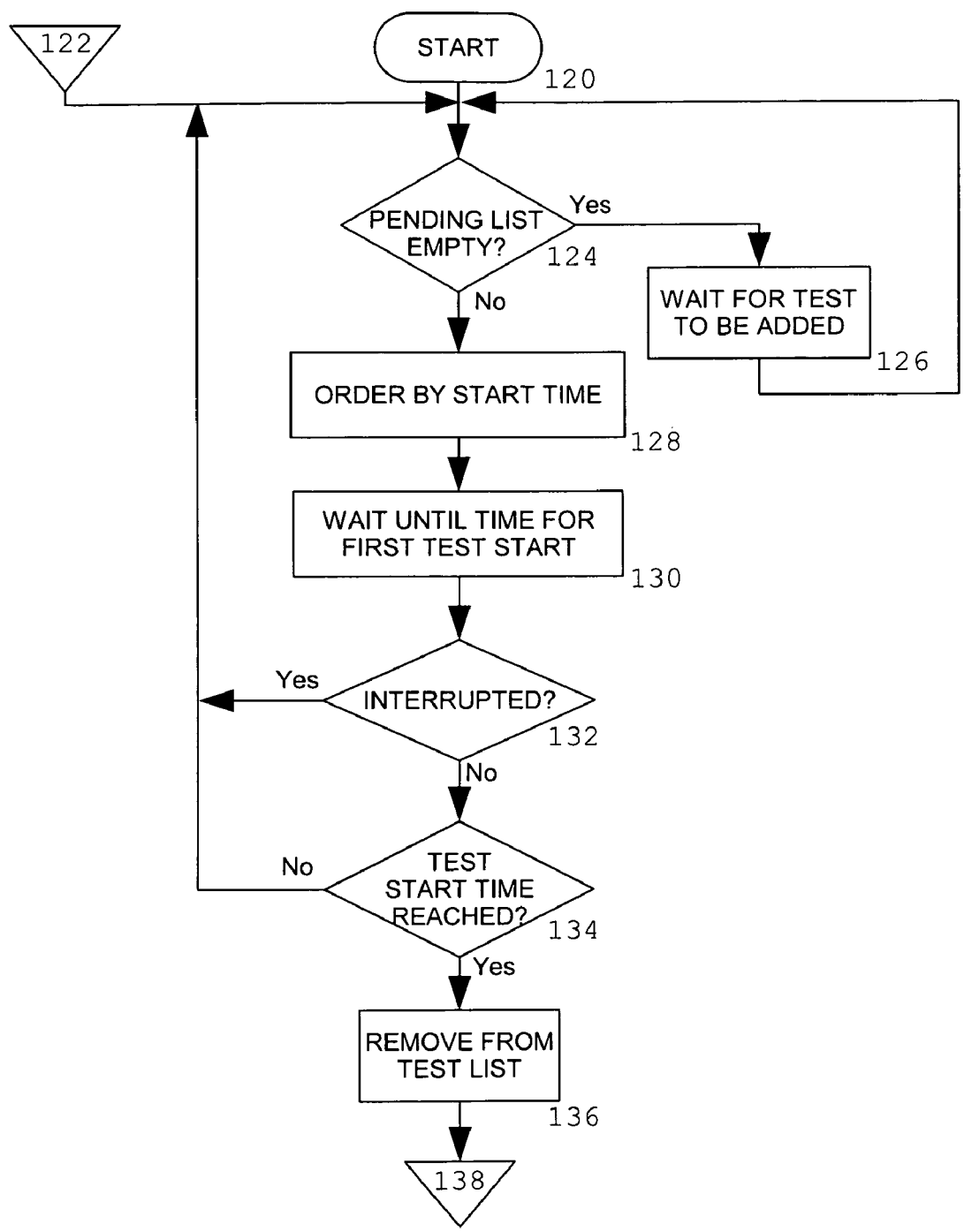
FIG. 6A, FIG. 6B and FIG. 6C are a flowchart that illustrates the behavior of a coordination server scheduling thread.
Figure 6B:
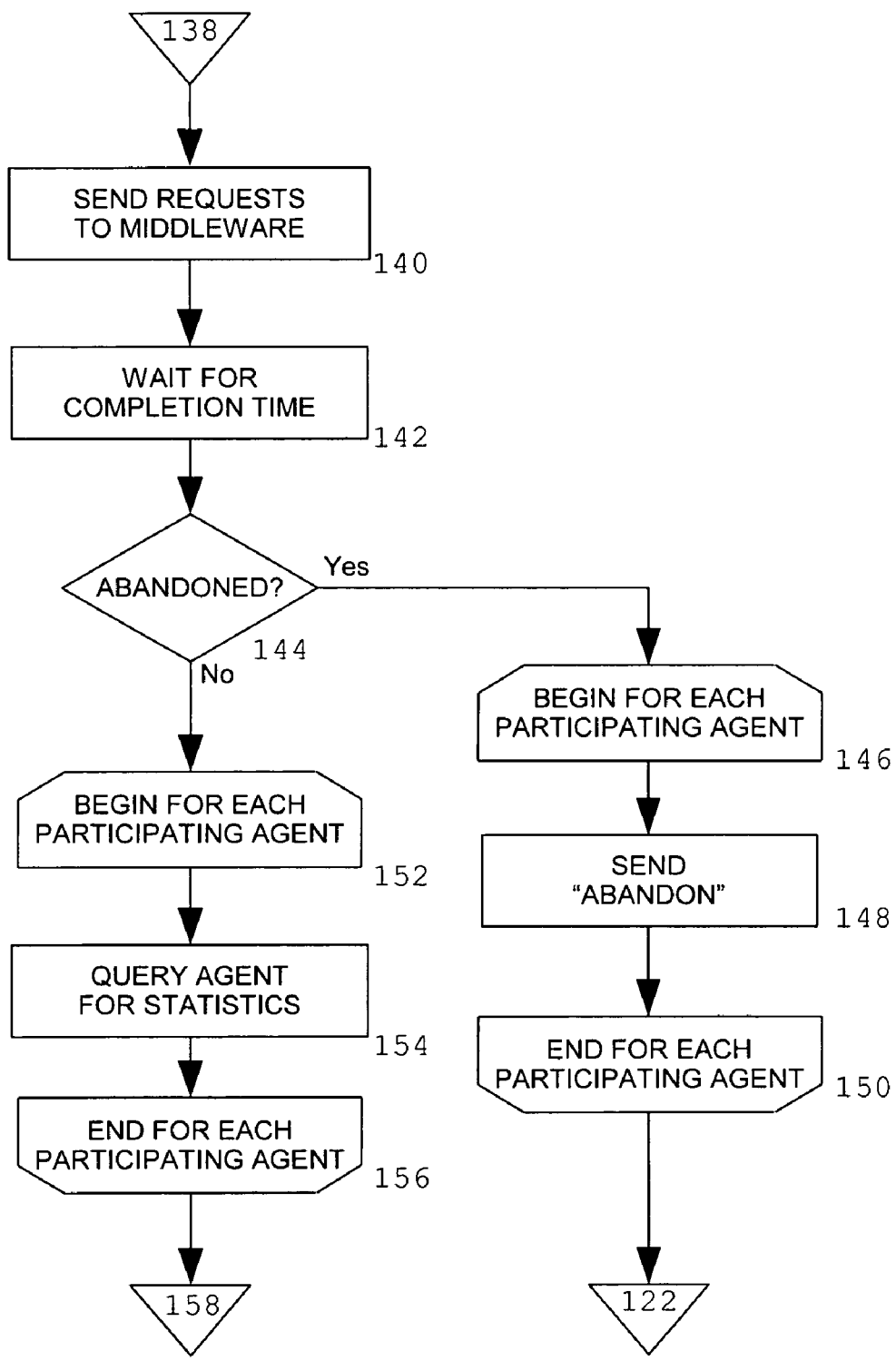
Figure 6C:
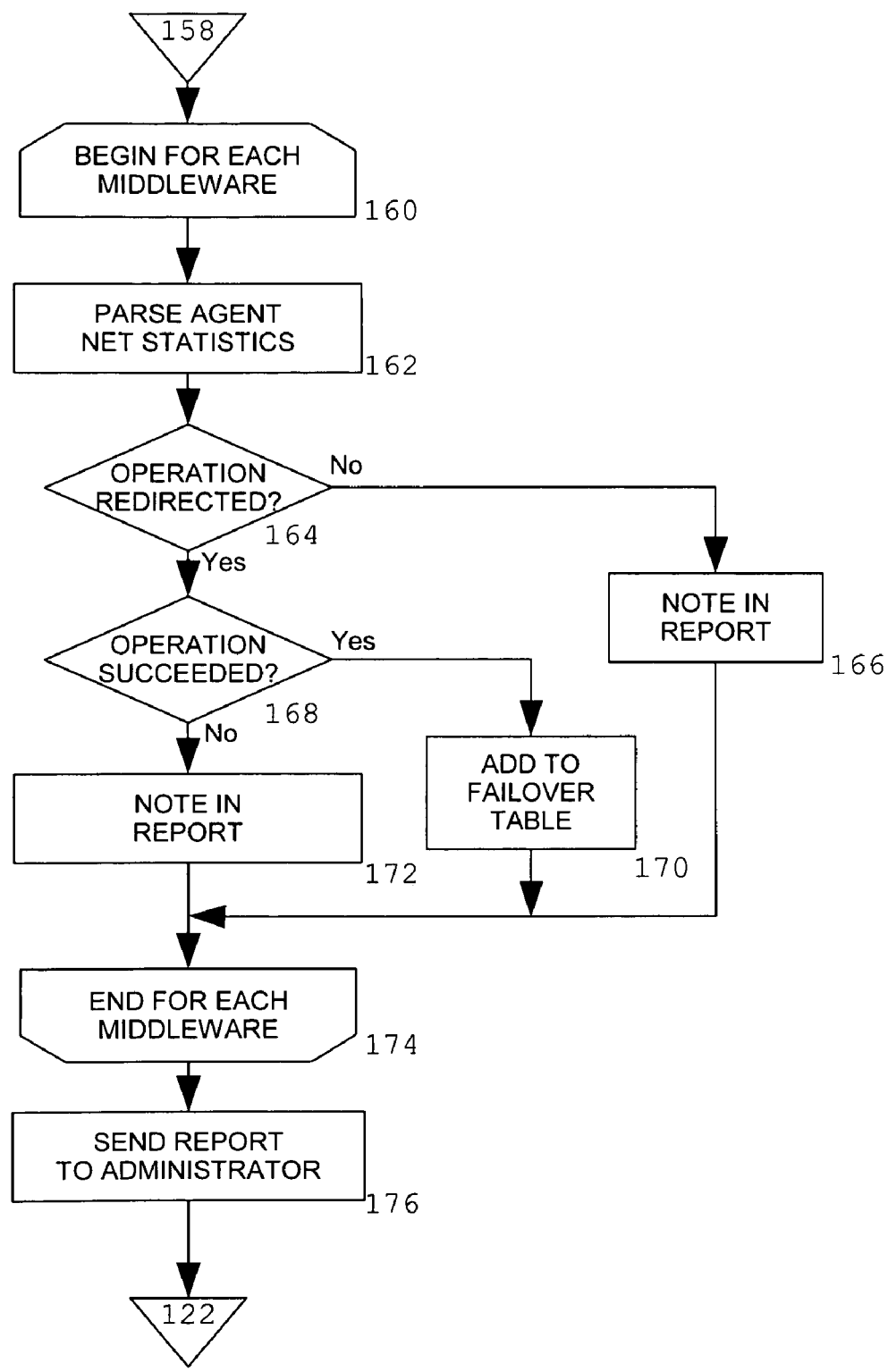

FIG. 6A, FIG. 6B and FIG. 6C contain a flowchart that illustrates the behavior of a coordination server scheduling thread. At step 124, the thread will check whether the pending list in the database is empty. If it is, then at step 126 the thread will wait for a test to be added to the database. At step 128, the thread will obtain the list of tests from the pending list table and order them by start time. At step 130, the thread will wait until the time for the first test to start. If the thread wait is interrupted, then at step 132 the thread will repeat the scan, in case the test list has been modified. If the test start time has not yet been reached, then at step 134 the thread will repeat the scan.

At step 136, the coordination server scheduling thread will remove the test from the database by removing the row for it from the pending list table. At step 140, the thread will send requests to the middleware servers, in order to cause them to attempt communication with the backend servers. The formats of the requests are determined from the rows of the middleware table (363) for each agent involved in the test. At step 142, the thread will then wait until the completion time of the test. At step 144, the thread will test whether this test was abandoned. If the test was abandoned, then at step 146, the thread will send an "abandon" command to each participating agent.

If the test was not abandoned, then at step 152, the thread will query each participating agent for the statistics from the network. At step 160, the thread will iterate through each middleware component. At step 162, the thread will parse the network statistics returned by the agent for that middleware. At step 164, the thread will determine from the statistics whether the operation resulting from the request sent from the coordination server to the middleware server was redirected to a known failover server for the backend server omitted from the test. If it was not redirected, then at step 166 the thread will note in the report for the test that the middleware server did not redirect to the failover server. At step 168, the thread will determine whether the operation succeeded. If the operation succeeded, then at step 170 the thread will add the backend server used by the middleware server to the failover table (if it is not already present). If the operation did not succeed, then at step 172 the thread will note in the report to the test that the middleware server test was inconclusive as the backend server was contacted but the operation was unsuccessful, which may indicate another configuration problem with the middleware. At step 176, the thread will add a row to the completion table and send the combined report for the test to the administrator.

Figure 7A:
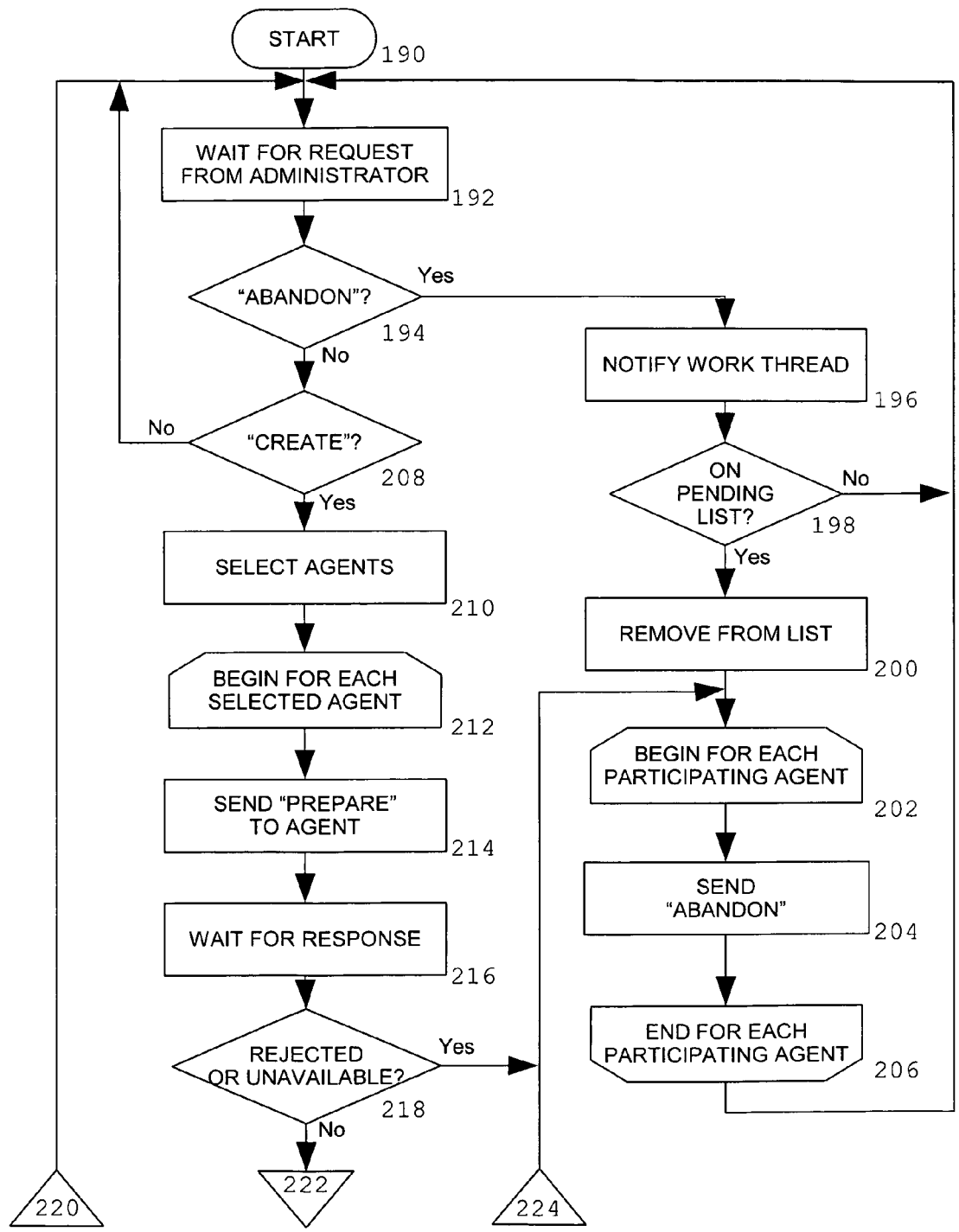
FIG. 7A and FIG. 7B are a flowchart that illustrates the behavior of a coordination server administrator interaction thread.
Figure 7B:
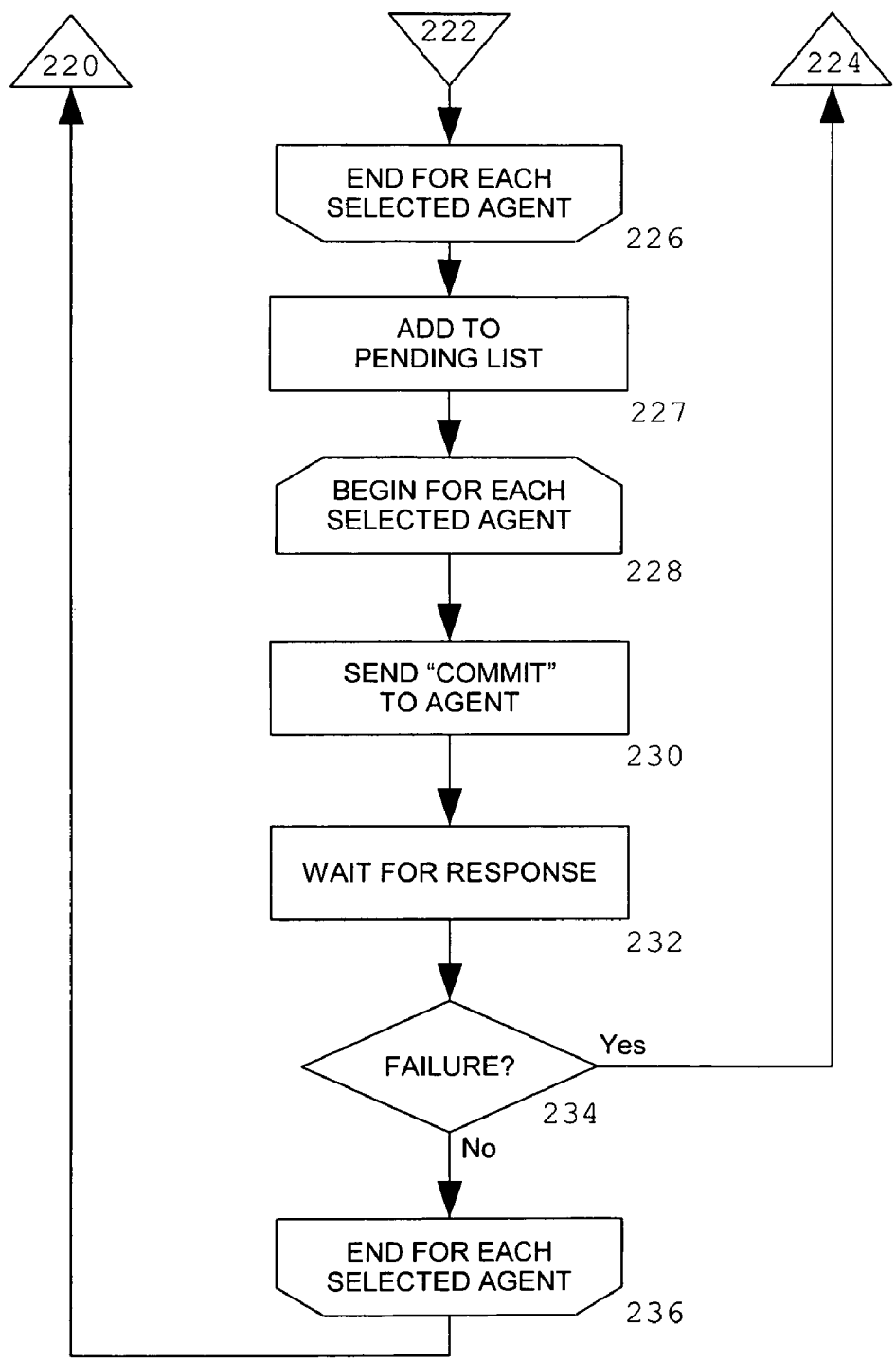

FIG. 7A and FIG. 7B contain a flowchart that illustrates the behavior of a coordination server administrator interaction thread. At step 192, the thread will wait for a request to be received from the administrator. At step 194, the thread will check whether the request is to abandon a test. If it is, then at step 196 the thread will notify the coordination server scheduling thread that the test was abandoned. At step 198, the thread will check whether the test is present in the pending list of tests in the pending list table. If the test is present, then at step 200 the thread will remove the test from the pending list table, and at step 202, will notify each participating agent of the test that the test is abandoned.

If the request from the administrator is to create a test, then at step 210 the thread will select appropriate agents for the middleware component being tested. This set will include the agent for that system, and for the backend systems indicated as failover servers required by that middleware component. At step 212, the thread will iterate through the selected agents, and send each a "prepare" command, indicating the test parameters. If an agent responds with a rejection, or an agent is unavailable, then at step 202 the thread will notify each agent that the test is abandoned. At step 227, the thread will add a row to the pending list table for the test. At step 228, the thread will iterate through the selected agents, and send each a "commit" command. If an agent responds with a reject, or an agent is unavailable, then at step 202 the thread will notify each agent that the test is abandoned.

FIG. 8 contains a flowchart that illustrates the behavior of a backend agent monitoring task thread. At step 242, the thread will wait for the completion time of the test, or until it receives notification that the test is abandoned. At step 244, the thread will check whether the test was abandoned. If the test was not abandoned, then at step 246 the thread will collect statistics from the network.

CONCLUSIONS

Many different embodiments of this invention may be constructed without departing from the scope of this invention. While this invention is described with reference to various implementations and exploitations, and in particular with respect to systems for managing distributed systems, it will be understood that these embodiments are illustrative and that the scope of the invention is not limited to them.

What is claimed is

1. A method for validating a failover behavior of a middleware server as a software component of a middleware computer system connected via a network to an alternate backend computer system and a backend computer system, said method comprising:
   (a) obtaining a command for configuring a protocol component of said middleware computer system,
   (b) configuring said protocol component of said middleware computer system according to said command,
   (c) transmitting a request for accessing a network-based service that provided by said backend computer system or said alternate backend computer system to said middleware server on said middleware computer system which was hosted by computer system subsequent to said protocol component having been configured,
   (d) monitoring said protocol component of said middleware computer system comprising determining whether during processing of said request said middleware server attempted to contact said alternate backend computer system,
   (e) receiving a response from said middleware server in response to said request in which said response indicates successful processing of said request by said middleware server, and
   (f) validating said failover behavior of said middleware server by both validating that said response indicates successful processing of said request by said middleware server and validating that a result of said monitoring indicated said alternate backend computer system was contacted by said middleware server during processing of said request
   wherein said command will cause said protocol component to permit said middleware server to have the ability to communicate with said alternate backend computer system said command will cause said protocol component to deny said middleware server to have the ability to communicate with said backend computer system to cause said middleware server to attempt to contact said alternate backend computer system during processing of said request to validate the failover behavior of said middleware server, and said request will cause said middleware server to attempt to contact said alternate backend computer system.

2. A system implemented in a plurality of computer systems interconnected via a network for validating a failover behavior of a middleware server, said system comprising:
   (a) a coordination server which is a first software component of a coordination server computer system,
   (b) an agent which is a second software component of a middleware computer system,
   (c) said middleware server which is a third software component of said middleware computer system,
   (d) a protocol component which is a fourth software component of said middleware computer system,
   (e) a backend computer system connected via said network to said middleware computer system,
   (f) an alternate backend computer system connected via said network to said middleware computer system and which is distinct from said backend computer system,
   (g) said coordination server computer system connected to said network, and
   (h) said middleware computer system which is distinct from said first computer system and is connected to said network, wherein said middleware computer system comprises a central processing unit, a network interface and a random access memory storing said middleware server,
   said middleware server relies upon said protocol component to communicate with said backend computer system and said alternate backend computer system, said coordination server transmits to said agent a command for configuring said protocol component which will cause said protocol component to permit said middleware server the ability to communicate with said alternate backend computer system and cause said protocol component to deny said middleware server the ability to communicate with said backend computer system to cause said middleware server to attempt to contact said alternate backend computer system during processing of a first request to validate said failover behavior of said middleware server,
   said agent configures said protocol component according to said command, said coordination server transmits, subsequent to said agent configuring said protocol component, to said middleware server said first request for accessing a network-based service which provided by said backend computer system or said alternate backend computer system,
   said middleware server attempts, while processing a first request, to send via said protocol component a plurality of coordinated requests comprising a second request directed to said backend computer system and a third request directed to said alternate backend computer system,
   said agent monitors said protocol component while said middleware server is processing said first request by recording whether during processing of said request said middleware server attempts to contact said alternate backend computer system, said middleware server transmits to said coordination server a response to said first request in which said response indicates successful processing by said middleware server,
   said agent transmits a result of monitoring said protocol component to said coordination server comprising a record of whether during processing of said request said middleware server attempted to contact said alternate backend computer system, said coordination server analyzes said response to said first request and said result of monitoring to determine whether during processing of said request said middleware server attempted to contact said alternate backend computer system and said backend computer system , and
   said coordination server validates said failover behavior of said middleware server by both validating that said response indicates successful processing by said middleware server and validating that said result indicated said alternate backend computer system was contacted by said middleware server.

3. A computer program product stored in a random access memory device for validating a failover behavior of a middleware server as a software component of a middleware computer system connected via a network to an alternate backend computer system and a backend computer system, said computer program product comprising
   (a) computer-implemented instructions for obtaining a command for configuring a protocol component of said middleware computer system,
   (b) computer-implemented instructions for configuring said protocol component of said middleware computer system according to said command, (c) computer-implemented instructions for transmitting a request for accessing a network-based service which provided by said backend computer system or said alternate backend computer system to said middleware server on said middleware computer system which was hosted by computer system, (d) computer-implemented instructions for monitoring said protocol component of said middleware computer system which comprises computer-implemented instructions for determining whether during processing of said request said middleware server attempted to contact said alternate backend computer system, (e) computer-implemented instructions for receiving a response from said middleware server in response to said request in which said response indicates successful processing by said middleware server, and (f) computer-implemented instructions for validating the failover behavior of said middleware server by both validating said response indicates successful processing by said middleware server and validating a result of said monitoring which indicated said alternate backend computer system was contacted by said middleware server during processing of said request, wherein said command will cause said protocol component to permit said middleware server to have the ability to communicate with said alternate backend computer system, said command will cause said protocol component to deny said middleware server to have the ability to communicate with said backend computer system to cause said middleware server to attempt to contact said alternate backend computer system during processing of said request to validate said failover behavior of said middleware server, and said request will cause said middleware server to attempt to contact said alternate backend computer system.

* * * * *